Nov. 19, 1929.　　F. R. WALLACE　　1,736,514
MOLDING MACHINE
Filed July 14, 1928　　4 Sheets-Sheet 1

WITNESS:

INVENTOR
Frank R. Wallace
BY
Augustus B. Stoughton
ATTORNEY.

Nov. 19, 1929.  F. R. WALLACE  1,736,514
MOLDING MACHINE
Filed July 14, 1928   4 Sheets-Sheet 3

WITNESS:

INVENTOR
Frank R. Wallace
BY
ATTORNEY.

Nov. 19, 1929.  F. R. WALLACE  1,736,514
MOLDING MACHINE
Filed July 14, 1928  4 Sheets-Sheet 4

INVENTOR
Frank R. Wallace
BY
Augustus B. Stoughton
ATTORNEY.

WITNESS:

Patented Nov. 19, 1929

1,736,514

UNITED STATES PATENT OFFICE

FRANK R. WALLACE, OF PHILADELPHIA, PENNSYLVANIA, ASSIGNOR TO THE TABOR MANUFACTURING COMPANY, OF PHILADELPHIA, PENNSYLVANIA, A CORPORATION OF PENNSYLVANIA

MOLDING MACHINE

Application filed July 14, 1928. Serial No. 292,353.

Most molding machines embody in their construction two members or elements which in superposed or confronting relation play an important part in making mold cavities in sand contained in flasks, or perhaps more accurately, half flasks interposed between them and suitably squeezed or rammed between them with or without jolting or jarring.

The principal object of the present invention is to simplify, cheapen and improve the operation of and means for getting the flask or half flask, which will be hereinafter referred to as a flask, out of a molding machine whereby delay is avoided in utilizing the molding machine for the production of additional flasks and whereby the construction of the machine is greatly simplified.

The invention comprises the improvements to be presently described and finally claimed but, generally stated, it may be said to consist of means whereby the ramming heat is availed of as a means for conveying a complete half mold out of the molding machine to a place where it is desired to deliver it, at the same time leaving the pattern on the mold table uncovered or unobstructed for the reception of another flask and sand.

The invention also comprises the improvements to be presently described and finally claimed.

In the following description reference will be made to the accompanying drawings forming part hereof and in which Figure 1 is an elevational view partly in section of a molding machine embodying features of the invention.

Figure 1:
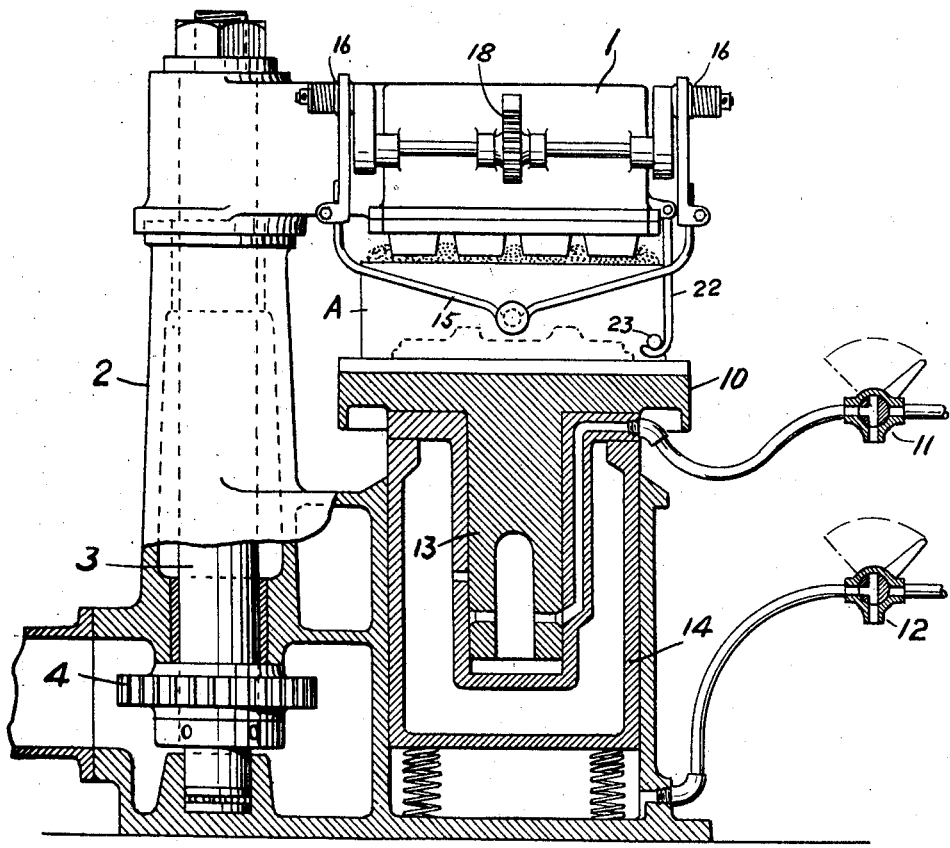
Figure 2:
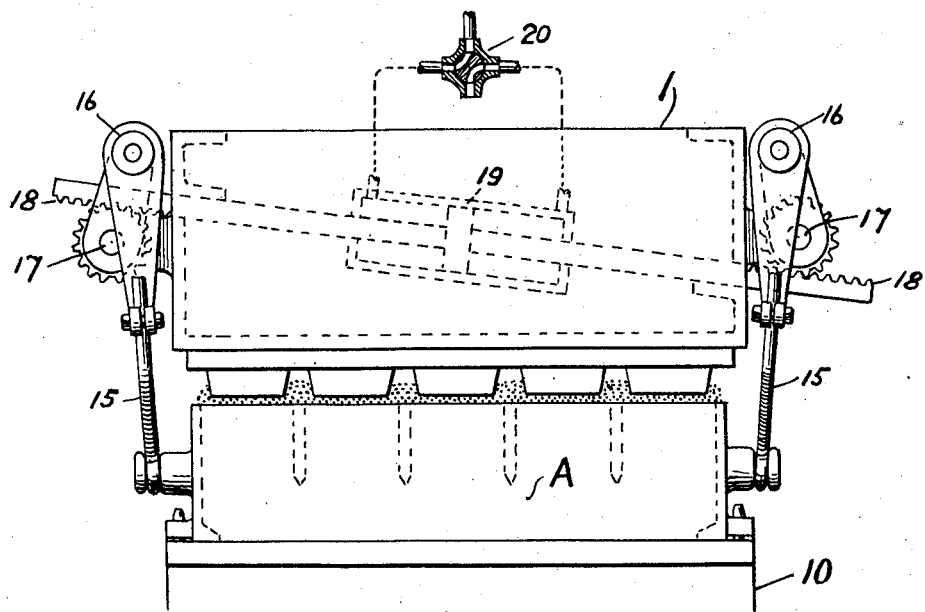
Fig. 2 is an end elevational view drawn to an enlarged scale of the ramming head shown in Fig. 1.
Figure 3:
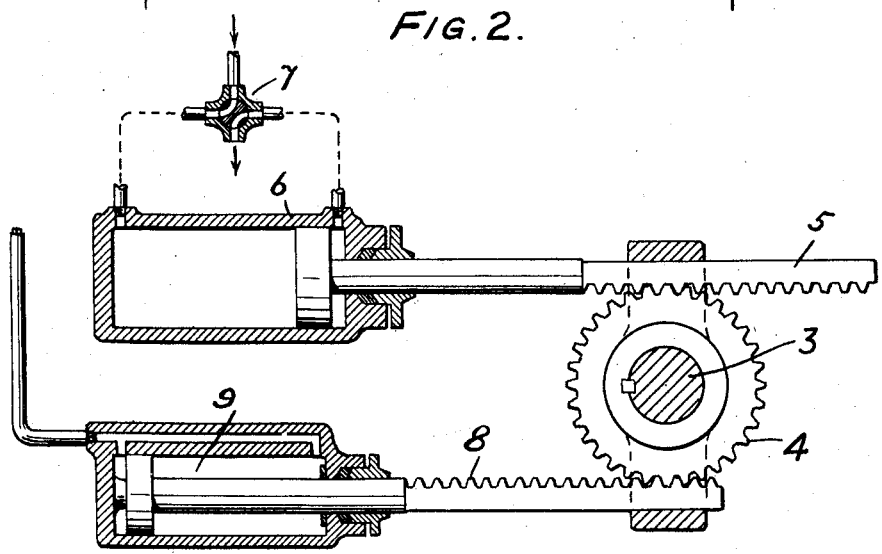
Fig. 3 is a top or plan sectional view of mechanism for turning the ramming head.

Referring to the drawings the ramming head 1 is mounted to turn about a vertical axis in the post or column 2. Referring to Fig. 3, one way of turning the ramming head is to attach it to the shaft 3 to which is secured the toothed wheel 4 actuated in one direction or the other by means of the rack 5 and piston and cylinder mechanism 6 controlled by the valve 7 which may be operated by hand. The rack 8 and piston and cylinder construction 9 constitute a dash pot mechanism. 10 is a mold table and as shown it happens to be the mold table of a shockless jar ramming machine. The valves 11 and 12 and their piston and cylinder mechanisms 13 and 14 are means for causing the mold table to move up and down vertically to jar ram and also to squeeze in respect to the head 1.

Hitherto it has been customary to move the ramming head 1 away from its position over the mold table to enable the flask A mounted on the table to be properly filled with sand and prior to that operation the flask previously completed has to be removed from the mold table 10 in order that the flask which is to be filled with sand may be placed upon the table 10. The finished flask was removed manually or by means of various hoisting mechanisms or devices added to the molding machine for that purpose but they involved expense and their use entailed delay.

According to the present invention the finished mold or flask is connected with, attached to or suspended from the ramming head, so that when the ramming head is turned it carries with it the finished mold or flask out of the machine to a place where it can be delivered. In the meantime another flask can be placed upon the table 10 and properly filled with sand.

Obviously by the present invention the ramming head is availed of as means for performing not only the function of resisting the ramming or squeezing pressure but also the function of a conveyor in taking the finished mold out of the machine while another flask may be in position on the mold table for receiving sand and also for being jarred or jar-rammed during the time that the finished mold is detached from the ramming head and the ramming head returned to its position over the mold table. Means are indicated in the drawings for suspending the flask from the ramming head. The means as shown are not new per se and in general they comprise bales 15 operated through friction mechanism 16 from shafts 17 which are turned by racks 18 operated by piston and cylinder mechanism 19 controlled by a valve 20.

Figure 4:
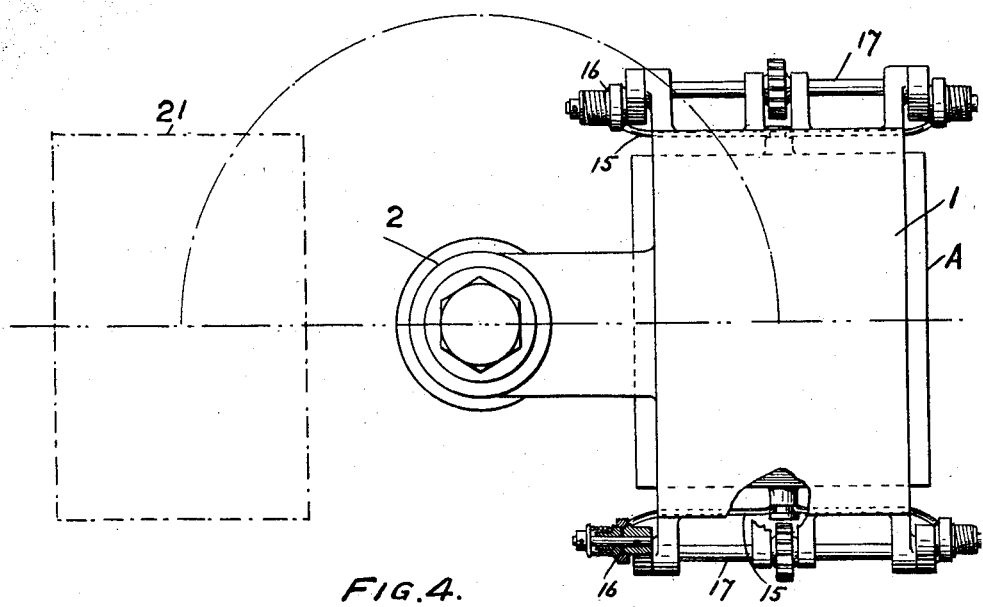
Fig. 4 is a diagrammatic plan view partly in section of a machine embodying features of the invention.
Figure 5:
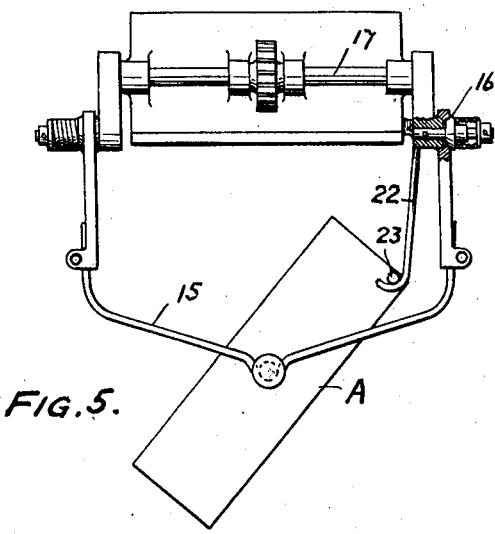
Fig. 5 is a view illustrating an operation hereinafter described.

The mode of operation of the described improvements may be explained as follows:

After a flask has been properly filled with sand and if desired jar rammed, it is by the mold table 10 squeezed against the ramming head 1 and by means of clamps such, for example, as 15, it is secured to the ramming head so as to be suspended from it and then the pattern is drawn. As the ramming head is turned in the path indicated by the broken circular line in Fig. 4, it carries the flask A out of the molding machine or away from its position over the mold table into, for example, the position indicated by dotted lines at 21 in which position the finished flask may be deposited and meanwhile another flask may be placed upon the mold table 10 and supplied with sand. A hook 22 pivoted to the ramming head may be employed and used to engage a projection 23 on the flask A when the latter is held up to and carried by the ramming head. When the ramming head is in the position, for example the position indicated at 21 in Fig. 4, and in which the finished flask is to be delivered, the bales or clamps 15 may be lowered away from the ramming head so that the flask is tilted by the hook 22 as indicated in Fig. 5 into position for delivery upon one of its sides or completely rolled over.

Figure 6:
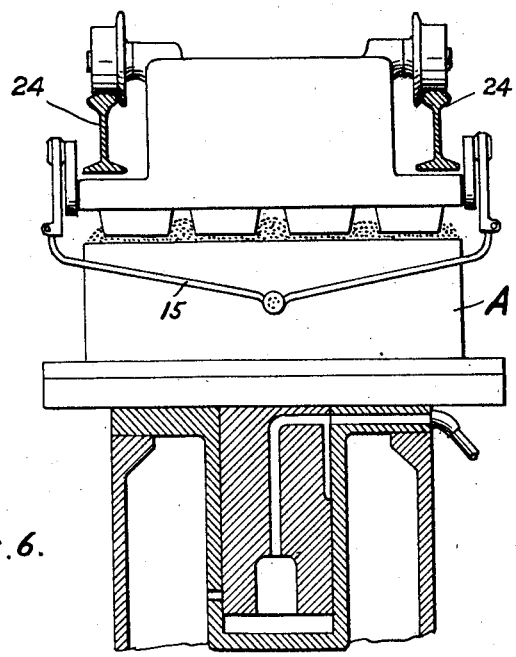
Fig. 6 is a view similar to Fig. 1 illustrating a modification.
Figure 7:
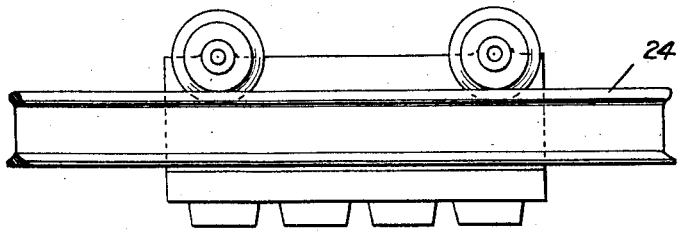
Fig. 7 is a side view of the ramming head shown in Fig. 6.

The construction and mode of operation of the modification illustrated in Figs. 6 and 7 are as above described except that the ramming head is moved in a generally horizontal path upon rails 24.

I claim:

1. In a molding machine the combination of a vertically movable mold table, a pattern connected to the table, a head movable into position for squeezing cooperation with the table for the production of mold cavities in flasks and into position away from said table, and means for securing a finished mold to said head for transportation by the latter into the last named position.

2. In a molding machine a head movable away from a flask frame in place on the machine and movable into position for cooperation with a pattern element provided in the machine and adapted to squeeze the flask against said head, and means for connecting the flask frame with a mold cavity therein to said head during the transit of the latter for the delivery of the flask frame.

3. In a molding machine the combination of a vertically movable mold table having a pattern thereon, and a head movable about a vertical axis into position for cooperation with the table to squeeze a flask and into position away from the table and provided with means for carrying a finished mold from the first named position to the last named position for delivery from the machine.

4. In a molding machine the combination of a vertically movable table having a pattern thereon, a head movable in a substantially horizontal path to a position over the table and to a position clear of the table, and a flask clamp carried by the head and adapted to draw a flask toward the head.

5. In a molding machine the combination of a vertically movable table having a pattern thereon, a head movable in a substantially horizontal path to a position over the table and to a position clear of the table, a flask clamp carried by the head and adapted to draw a flask toward and away from the head, and a detent device adapted to connect the flask with the head to tip the flask.

6. A molding machine provided with movable elements adapted to squeeze a flask between them and of which one is a squeezing head and the other a pattern carrier, means for affording the head movement to one side of the other element, and means for connecting a flask to the head to permit the latter to carry the flask in its last described movement and to leave the pattern exposed for the application of another flask.

7. In a molding machine the combination of a table mounted for vertical movement and having a pattern thereon, a head mounted for substantially horizontal movement over the table and to one side thereof, and a flask clamp for connecting flasks previously operated upon by said table and head with the head to permit the head to carry flasks out of the machine and to expose the pattern for the application of another flask.

FRANK R. WALLACE.